United States Patent [19]

Nakajima

[11] Patent Number: 5,028,782
[45] Date of Patent: * Jul. 2, 1991

[54] METHOD OF ADJUSTING IMAGE PROCESSING CONDITIONS

[75] Inventor: Nobuyoshi Nakajima, Kanagawa, Japan

[73] Assignee: Fuji Photo Film Co., Ltd., Kanagawa, Japan

[*] Notice: The portion of the term of this patent subsequent to Feb. 14, 2006 has been disclaimed.

[21] Appl. No.: 529,677

[22] Filed: May 25, 1990

Related U.S. Application Data

[63] Continuation of Ser. No. 148,835, Jan. 27, 1988, abandoned.

[30] Foreign Application Priority Data

Jan. 27, 1987 [JP] Japan .................................. 62-17040

[51] Int. Cl.$^5$ ............................................ G01N 23/04
[52] U.S. Cl. ................................ 250/327.2; 250/484.1
[58] Field of Search .................. 250/327.2 A–327.2 G, 250/484.1 B; 364/413.13

[56] References Cited

U.S. PATENT DOCUMENTS 4,258,264  3/1981  Kotera et al. .
4,682,028  7/1987  Yanaka et al. .................. 250/327.2

FOREIGN PATENT DOCUMENTS 56-11395  2/1981  Japan .

OTHER PUBLICATIONS

Young et al., "Handbook of Pattern Reg. and Image Processing", (1986), p. 225, Academic Press (Inc.).

Primary Examiner—Jack I. Berman
Assistant Examiner—Richard Hanig
Attorney, Agent, or Firm—Sughrue, Mion, Zinn, Macpeak & Seas

[57] ABSTRACT

In a method of adjusting image processing conditions for use in processing of final read-out image signals obtained by final read-out carried out for detecting the image signals used in reproduction of a visible image from a recording medium carrying a radiation image recorded thereon by limitation of an irradiation field, a histogram of the final read-out image signals obtained by the final read-out is created. Prospective edge point signals which are considered to be signals representing edge portions of the irradiation field are detected from the final read-out image signals. A region of a lever lower than the level of a characteristic value representing the prospective edge point signals is removed from the histogram, and the image processing conditions are adjusted on the basis of the histogram outside of the lower level region.

7 Claims, 4 Drawing Sheets

F I G. 3

F I G. 4

FINAL READ IMAGE SIGNAL
(PASSING RADIATION AMOUNT)

F I G. 5

FINAL READ IMAGE SIGNAL
(PASSING RADIATION AMOUNT)

F I G. 6

PROSPECTIVE EDGE POINT SIGNAL
(PASSING RADIATION AMOUNT)

FIG. 7

METHOD OF ADJUSTING IMAGE PROCESSING CONDITIONS

This is a continuation of application Ser. No. 07/148,835, filed Jan. 27, 1988, now abandoned.

BACKGROUND OF THE INVENTION

1. Field of the Invention

This invention relates to a method of adjusting image processing conditions for use in the processing of the image signals for reproduction of a visible image which are detected from a recording medium such as a stimulable phosphor sheet carrying a radiation image recorded thereon by limitation of the irradiation field of the radiation.

2. Description of the Prior Art

When certain kinds of phosphors are exposed to radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected to obtain final read-out image signals for use in reproduction of a visible image, image processing is carried out on the final read-out image signals, and the radiation image of the object is reproduced as a visible image by use of the processed final read-out image signals on a recording material such as a photographic film, a display device such as a cathode ray tube (CRT), or the like.

In this specification, detection of the image signals for use in reproduction of the visible image is referred to as the final read-out, and the image signals obtained by the final read-out are referred to as the final read-out image signals. The terms "final read-out" and "final read-out image signals" are used in the same senses also in the case where the recording medium is of the type different from the stimulable phosphor sheet.

In general, the image processing in the aforesaid radiation image recording and reproducing system is carried out by use of image processing conditions adjusted for each image in accordance with the image recording portion of the object and/or the image recording method to obtain a visible image suitable for viewing, particularly for diagnostic purposes. However, it may be considered that the image processing conditions be adjusted on the basis of, for example, a histogram of the final read-out image signals (i.e. a histogram of the levels of the image signals), instead of the image recording portion of the object and/or the image recording method, or on the basis of both the final read-out image signals and the image recording portion of the object and/or the image recording method.

In the case where the image processing is carried out by use of the image processing conditions adjusted on the basis of the histogram of the final read-out image signals which directly represent the nature of each radiation image, it becomes possible to obtain a visible image always having an improved image quality, particularly a high diagnostic efficiency and accuracy, i.e. a visible image wherein the necessary object image information is always expressed within the density range suitable for viewing, particularly for diagnostic purposes, regardless of any fluctuation in the level of the radiation energy stored on the stimulable phosphor sheet, which is caused by changes in the object, the image recording portion thereof, radiation dose, or the like.

On the other hand, in the case where the aforesaid radiation image recording and reproducing system is used for medical diagnosis, and generally in the case where a radiation image of the human body is recorded, portions of the human body not related to diagnosis should not be exposed to the radiation since it is harmful to the human body. Further, when the human body portions not related to diagnosis are exposed to radiation, the radiation is scattered by such portions to the portion related to the diagnosis, and the contrast and resolution are adversely affected by the scattered radiation. Therefore, the irradiation field is often limited in the course of the recording of a radiation image.

However, in the case where a radiation image is recorded by limiting the irradiation field as mentioned above, it is not always possible to obtain such appropriate image processing conditions as originally expected to be obtained by the adjustment based on the histogram of the final read-out image signals, even though the image processing conditions are adjusted on the basis of the histogram of the final read-out image signals detected from the stimulable phosphor sheet.

This is because, in the case where image recording is carried out by limitation of the irradiation field as mentioned above, the radiation scattered by the object within the irradiation field normally passes outside of the irradiation field. The scattered radiation is absorbed and stored on the stimulable phosphor sheet which exhibits high sensitivity, and therefore the histogram of the levels of the final read-out image signals includes the image signal level caused by the scattered radiation. Accordingly, in the case where the image processing conditions are adjusted on the basis of the histogram of the final read-out image signals, it follows that the image processing conditions are adjusted based on the histogram including image signals (noise) caused by the scattered radiation, instead of the histogram of the image signals representing the true image inside of the irradiation field.

Therefore, in the case where image recording is carried out by limiting the irradiation field and the image processing conditions are to be adjusted based on the histogram of the final read-out image signals as mentioned above, the image processing conditions should preferably be adjusted based on the histogram of noise-free image signals obtained by eliminating the information caused by the scattered radiation, instead of being adjusted directly based on the histogram of the image signals detected by the final read-out.

Besides the case of image recording utilizing the stimulable phosphor sheet, the aforesaid problems with regard to the adjustment of the image processing conditions arise generally in the case where a radiation image is recorded on a recording medium by limitation of the irradiation field.

By the term "image processing conditions" as used herein are meant various conditions affecting the relationship between the input to the image processing means and the output thereof, for example, gradation processing conditions and frequency response processing conditions.

SUMMARY OF THE INVENTION

The primary object of the present invention is to provide a method of adjusting image processing conditions based on a histogram of noise-free final read-out image signals obtained by eliminating the information caused by scattered radiation outside of the irradiation field in the case where a radiation image is recorded on a recording medium such as a stimulable phosphor sheet by limiting the irradiation field.

Another object of the present invention is to provide a method of adjusting image processing conditions which is carried out by use of a simple and cheap apparatus.

The present invention provides a method of adjusting image processing conditions in the case where final read-out image signals obtained by final read-out carried out for detecting the image signals for use in reproduction of a visible image from a recording medium carrying a radiation image recorded thereon by limitation of an irradiation field are processed, the method of adjusting image processing conditions comprising the steps of:

(i) creating a histogram of said final read-out image signals obtained by said final read-out, (ii) detecting prospective edge point signals, which are considered to be signals representing edge portions of said irradiation field, from said final read-out image signals, (iii) removing a region of a level lower than the level of a characteristic value representing said prospective edge point signals from said histogram, and (iv) adjusting said image processing conditions on the basis of said histogram outside of said lower level region.

By the term "recording medium" as used herein is meant a medium capable of recording a radiation image thereon, such as a stimulable phosphor sheet. However, the recording medium is not limited to the stimulable phosphor sheet.

By the term "final read-out image signals" as used herein are meant the image signals for use in reproduction of a visible image which are detected from the recording medium. In the present invention, the final read-out image signals of the histogram used in the course of adjustment of the image processing conditions are the same as the image signals subjected to the image processing.

Also, the term "adjusting the image processing conditions on the basis of a histogram" as used herein embraces the case wherein the image processing conditions are adjusted based on the histogram alone and the case wherein they are adjusted based on the histogram and other factors, for example, the image recording portion of the object and/or the image recording method.

Adjustment of the image processing conditions may be carried out in any manner insofar as the adjustment is effected on the basis of the aforesaid histogram, i.e. by the utilization of the histogram.

The image processing conditions may typically be gradation processing conditions, but are not limited thereto.

The prospective edge point signals may be detected by, for example, differentiation processing of digitized final read-out image signals. Differentiation processing may be one-dimensional differentiation of first or higher order, or two-dimensional differentiation of first or higher order. In the case of a discretely sampled image, differentiation is equivalent to calculation of differences among the image signals which are present in the vicinity.

The levels of the final read-out image signals are proportional to the levels of energy of the radiation impinging upon the recording medium such as the stimulable phosphor sheet in the image recording step. Therefore, in general, the image signals outside of the irradiation field are of low quantum levels, and the image signals inside of the irradiation field are of high quantum levels. Accordingly, in the case where differentiation processing is carried out in a predetermined picture element array direction on the recording medium and the difference, i.e. the absolute value of the differentiated value, exceeds a predetermined value at a point, it may be regarded that said point is present on the edge of the irradiation field. That is, the final read-out image signal at said point may be regarded as the prospective edge point signal. Since the prospective edge point signal represents the edge portion which is a transition point from the outside of the irradiation field exposed to no radiation to the inside of the irradiation field, the prospective edge point signal is normally of a level lower than the levels of the image signals representing the image inside of the irradiation field. Therefore, a region of a level lower than a characteristic value representing the prospective edge point signals, for example, a signal value at which the frequency is the maximum in the histogram of the prospective edge point signals, or the minimum value or a median value of the prospective edge point signals, is removed from the histogram of the final read-out image signals including the read-out signals outside of the irradiation field. Thus it is possible to obtain a histogram wherein almost all of the final read-out image signals outside of the irradiation field are eliminated, i.e. a histogram of almost only the image signals inside of the irradiation field. Namely, the histogram obtained after the removal of the aforesaid lower level region accurately represents the radiation image recorded on the recording medium (the radiation image inside of the irradiation field).

With the method utilizing the aforesaid differentiation processing, no prospective edge point signal can be detected for an edge portion parallel with the direction of differentiation. However, in the present invention, the irradiation field itself need not be detected, and only the levels of the prospective edge point signals should be detected. Therefore, the direction of differentiation may be selected arbitrarily, and several prospective edge point signals may be detected.

Also, in the course of detecting the prospective edge point signals by differentiation processing, an image portion inside of the irradiation field where the image density changes sharply, for example, a bone edge portion, may be detected as the prospective edge point signal. However, in the case where all of the prospective edge point signals are processed and the characteristic value representing the prospective edge point signals, such as the signal value at which the frequency is the maximum, is calculated, said characteristic value becomes approximately equal to the level of the signal representing the actual edge portion of the irradiation field. Accordingly, in the case where the region of a level lower than the characteristic value is removed from the histogram of the final read-out image signals, the image signals inside of the irradiation field which generally have levels higher than the level at the edge portion of the irradiation field are substantially not eliminated from the histogram.

With the method of adjusting image processing conditions in accordance with the present invention wherein the prospective edge point signals which are considered to be signals representing edge portions of the irradiation field are detected from the final read-out image signals, and a region of a level lower than the level of a characteristic value representing the prospective edge point signals is removed from the histogram of the final read-out image signals, thereby to obtain the histogram outside of the lower level region, it is possible to obtain the histogram of only the image signals inside of the irradiation field, which histogram is substantially free from noise caused by the scattered radiation. The image processing conditions are adjusted on the basis of the histogram thus obtained, and therefore the image processing conditions can be adjusted to appropriate values without being adversely affected by noise caused by the scattered radiation.

Also, with the method of adjusting image processing conditions in accordance with the present invention, the adverse effects of the portion outside of the irradiation field are eliminated without the irradiation field itself being recognized. Therefore, the method of adjusting image processing conditions in accordance with the present invention can be carried out by use of an apparatus which is simpler and cheaper than the case where recognition of the irradiation field is carried out.

DESCRIPTION OF THE PREFERRED EMBODIMENTS

The present invention will hereinbelow be described in further detail with reference to the accompanying drawings.

Figure 1:
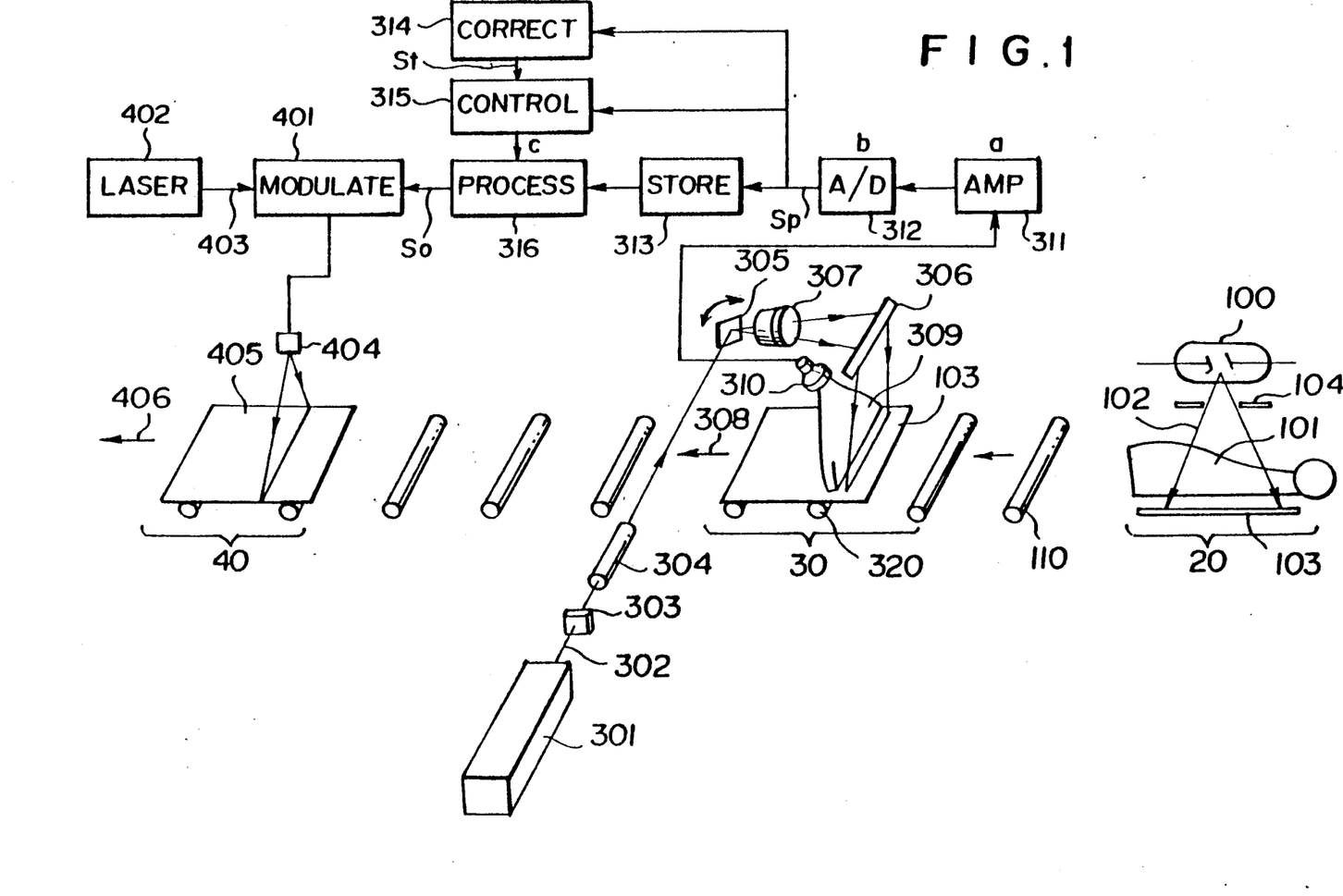
FIG. 1 is a schematic view showing the radiation image recording and reproducing system wherein an embodiment of the method of adjusting image processing conditions in accordance with the present invention is employed.

With reference to FIG. 1, a radiation image recording and reproducing system basically comprises a radiation image recording section 20, a final read-out section 30, and an image reproducing section 40. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103. An irradiation field stop 104 for limiting the irradiation field of the radiation 102 is disposed between the radiation source 100 and the object 101.

The stimulable phosphor sheet 103 carrying the radiation image of the object 101 stored thereon is sent to the final read-out section 30 by a sheet conveyance means 110 constituted by a conveyor roller or the like. At the final read-out section 30, a laser beam 302 emanated by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then linearly deflected by a light deflector 305 formed of a galvanometer mirror or the like, and is made to impinge upon the stimulable phosphor sheet 103 by a plane reflection mirror 306. The laser beam source 301 is selected so that the laser beam 302 emanated thereby has a wavelength distribution different from and far apart from the wavelength distribution of the light emitted by the stimulable phosphor sheet 103 upon stimulation thereof. Between the light deflector 305 and the plane reflection mirror 306 is disposed an $f\theta$ lens 307 for maintaining the beam diameter of the laser beam 302 uniform in the course of the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. in the sub-scanning direction) by a sheet conveyance means 320 constituted by conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the radiation energy stored thereon, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emanated from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 on the basis of a read-out gain (a) adjusted to an appropriate value. The amplified electric signals are fed to an A/D converter 312 which converts the electric signals into digital signals of an appropriate signal level width on the basis of a scale factor (b) adjusted to an appropriate value and feeds out them as final read-out image signals Sp. The final read-out image signals Sp are stored in a storage circuit 313 constituted by a frame memory or the like, and fed to a correction circuit 314 as will be described later and a control circuit 315 which calculates gradation processing conditions (c) as one kind of the image processing conditions. Then, the final read-out image signals Sp stored in the storage circuit 313 are read therefrom and fed to a signal processing circuit 316, in which they are subjected to signal processing (image processing) based on the image processing conditions (c) calculated by the control circuit 315 so as to obtain a visible radiation image suitable for viewing, particularly for diagnostic purposes, and are output as image signals (final read-out image signals) So.

The final read-out image signals So generated by the signal processing circuit 316 are fed to a light modulator 401 at the image reproducing section 50. At the image reproducing section 50, a laser beam 403 emanated by a reproducing laser beam source 402 is modulated by the light modulator 401 on the basis of the final read-out image signals So received from the signal processing circuit 316, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signals So is recorded on the photosensitive material 405. For reproducing the radiation image, it is possible to use any other appropriate method such as the aforesaid displaying on a CRT.

Figure 2:
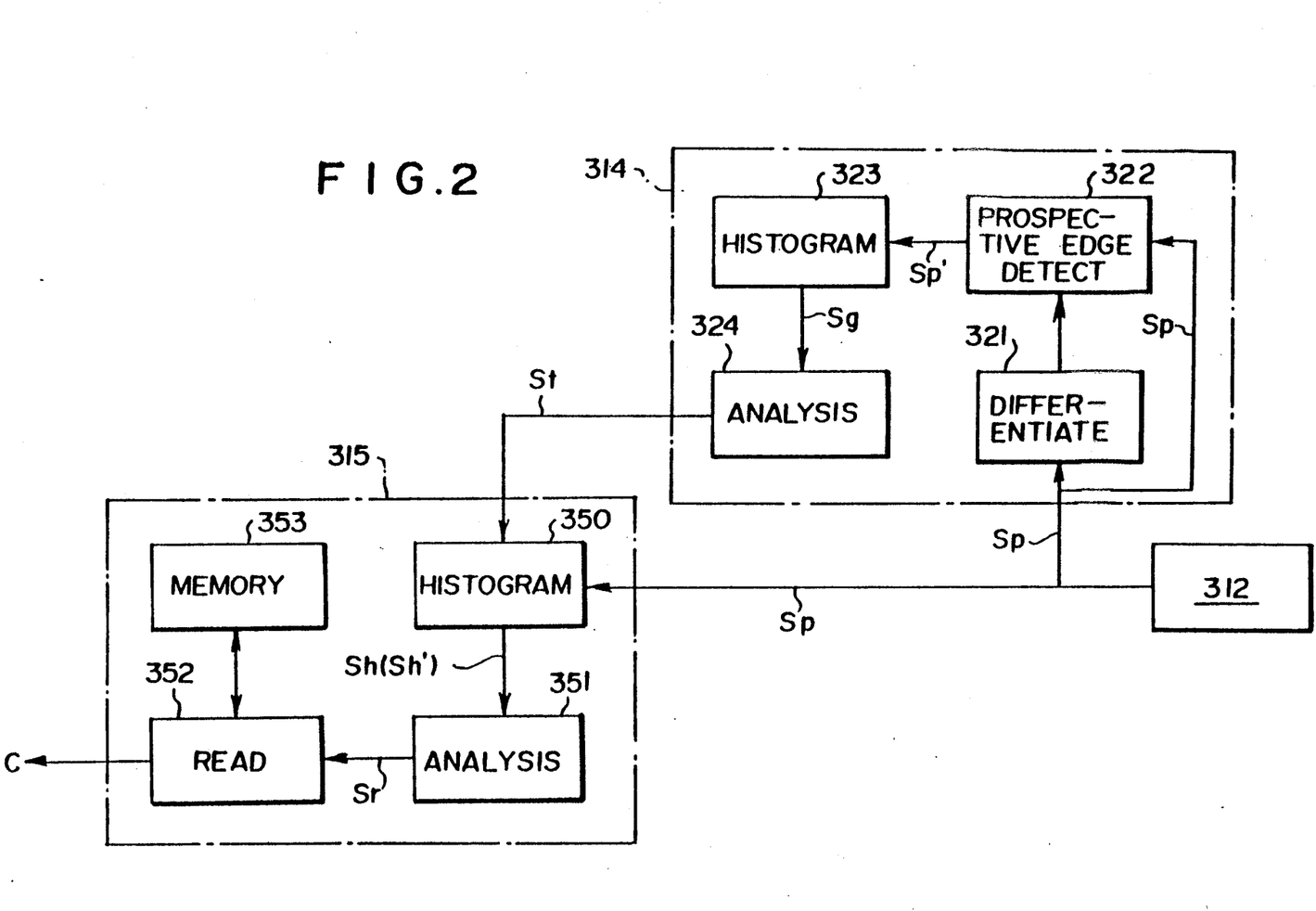
FIG. 2 is a block diagram showing a part of the radiation image recording and reproducing system shown in FIG. 1.
Figure 3:
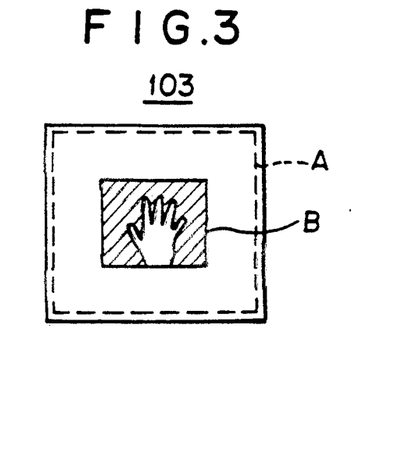
FIG. 3 is an explanatory view showing the condition of a radiation image stored on a stimulable phosphor sheet.
Figure 4:
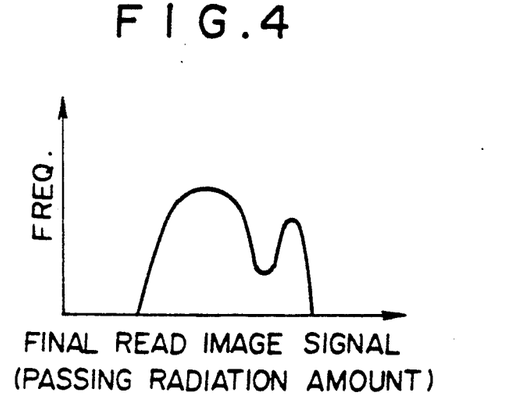
FIGS. 4 and 5 are graphs showing examples of the histograms of the final read-out image signals.

A technique of adjusting the gradation processing conditions (c) to appropriate values even though the irradiation field on the stimulable phosphor sheet 103 is limited as shown in FIG. 3 will hereinbelow be described with reference to FIG. 2. As shown in FIG. 2, the control circuit 315 comprises a histogram creation means 350, a histogram analysis means 351, a read means 352, and a memory means 353. The aforesaid final read-out image signals Sp are sent to the histogram creation means 350 which creates a histogram of all of the final read-out image signals Sp. In the case where the irradiation field is not limited, the histogram becomes as shown in, for example, FIG. 4. On the other hand, in the case where the irradiation field is limited on the stimulable phosphor sheet 103, the histogram becomes as shown in, for example, FIG. 5.

In the case where the irradiation field is not limited, signals Sh directly representing the histogram are sent to the histogram analysis means 351, which analyzes the histogram based on the histogram signals Sh, calculates the maximum value, the minimum value, the signal value at which the frequency is the maximum, or the like, and sends a signal Sr representing the calculated value to the read means 352. The memory means 353 stores the gradation processing conditions (c) corresponding to the aforesaid maximum value, the minimum value, the signal value at which the frequency is the maximum, or the like. The read means 352 reads the gradation processing conditions (c) corresponding to the signal Sr from the memory means 353, and sends them to the signal processing circuit 316.

Figure 6:
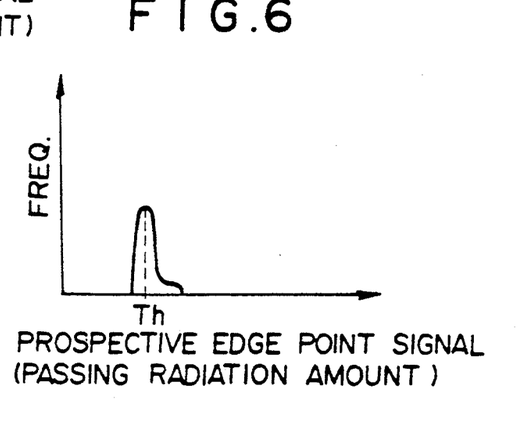
FIG. 6 is a graph showing an example of the histogram of the prospective edge point signals.

On the other hand, in the case where the irradiation field is limited on the stimulable phosphor sheet 103, the histogram created by the histogram creation means 350 is corrected, and signals Sh' representing the corrected histogram are sent to the histogram analysis means 351. Correction of the histogram is carried out in the manner as described below. The correction circuit 314 comprises a differentiation processing means 321, a prospective edge point signal detecting means 322, a histogram creation means 323, and a histogram analysis means 324. In the correction circuit 314, the final read-out image signals Sp are fed to the differentiation processing means 321 and the prospective edge point signal detecting means 322. The differentiation processing means 321 differentiates the digitized final read-out image signals Sp in a predetermined picture element array direction, and calculates the differences as mentioned above. The prospective edge point signal detecting means 322 extracts the final read-out image signals Sp at points where the calculated differences exceed a predetermined value, and sends only the extracted final read-out image signals Sp' to the histogram creation means 323. Almost all of the final read-out image signals Sp' thus extracted become the image signals representing the edge portions of the irradiation field B on the stimulable phosphor sheet 103 as shown in FIG. 3, i.e. the prospective edge point signals. (As mentioned above, some of the extracted final read-out image signals Sp' may be the image signals at bone edge portions in the image inside of the irradiation field.) The histogram creation means 323 creates the histogram of the prospective edge point signals Sp'. In this manner, a histogram as shown in, for example, FIG. 6 is obtained. Signals Sg representing the histogram thus obtained are fed to the histogram analysis means 324. Based on the signals Sg, the histogram analysis means 324 calculates a signal value Th at which the frequency is the maximum in the histogram as shown in FIG. 6. The maximum frequency signal value Th is somewhat different from the image signals at bone edge portions or the like, and is approximately equal to the levels of most of the signals representing the edge portions of the irradiation field B. In this manner, the maximum frequency signal value Th is calculated as the characteristic value that represents the prospective edge point signals Sp', and a signal St representing the maximum frequency signal value Th is fed to the histogram creation means 350 of the control circuit 315.

Figure 5:
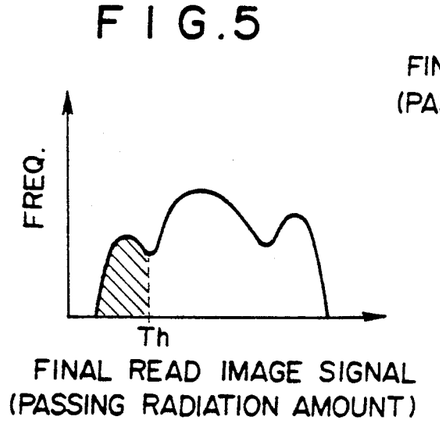

Upon receiving the signal St, the histogram creation means 350 corrects the created histogram so that a region of a level lower than the maximum frequency signal value Th is removed, i.e. the region hatched in FIG. 5 is removed. Therefore, in this case, the gradation processing conditions (c) are adjusted on the basis of the histogram corrected in the manner as mentioned above. The corrected histogram is constituted almost only by the image signals inside of the irradiation field B. Accordingly, in the case where the gradation processing conditions (c) are adjusted based on the corrected histogram, it becomes possible to adjust them to values appropriate for the radiation image actually stored on the stimulable phosphor sheet 103.

A switch for controlling the operation of the correction circuit 320 should preferably be provided so that the histogram correction is carried out only when the irradiation field B is limited. Also, the differentiation processing means 321 may be constituted to smooth in advance the final read-out image signals Sp at a plurality of adjacent picture elements, and to differentiate the smoothed digital image signals.

Also, instead of using the maximum frequency signal value Th in the histogram of the prospective edge point signals Sp' as the characteristic value representing the prospective edge point signals Sp', it is also possible to use, for example, the minimum value or the median value of the prospective edge point signals Sp'.

Figure 7:
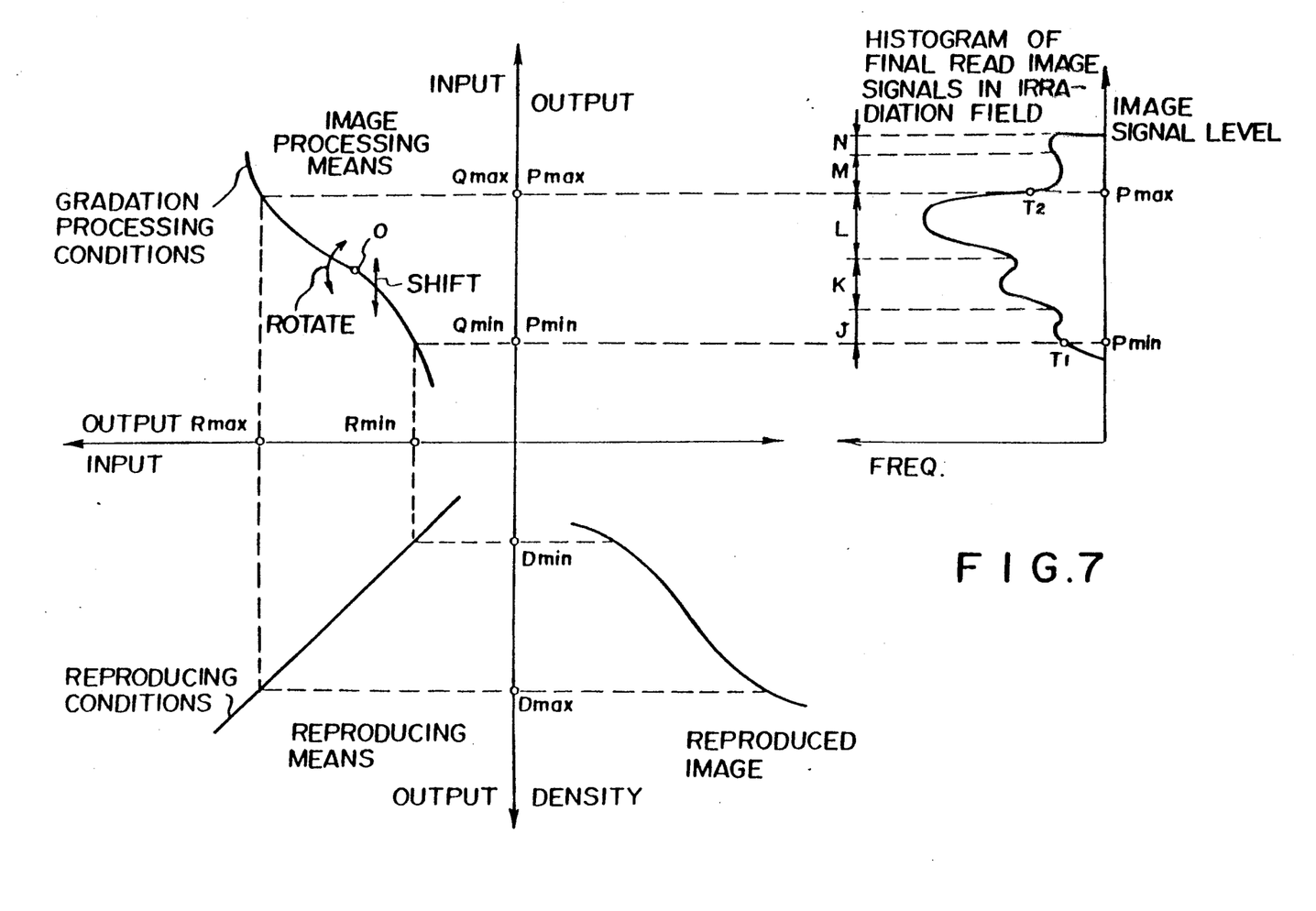
FIG. 7 is an explanatory graph showing an example of adjustment of gradation processing conditions in the embodiment of the method of adjusting image processing conditions in accordance with the present invention.

An example of the method of adjusting the gradation processing conditions on the basis of the histogram (i.e. the final read-out image signals inside of the irradiation field) obtained by removing the region of a level lower than the level of the characteristic value, that represents the prospective edge point signals, from the histogram of the final read-out image signals will hereinbelow be described in further detail with reference to FIG. 7.

In this method, a desired image signal range is determined on the basis of the histogram of the final read-out image signals inside of the irradiation field obtained in the manner as mentioned above. Since the pattern of the histogram is approximately fixed by the image recording portion of an object and/or the image recording method, the desired image signal range is determined from the histogram with reference to the image recording portion of an object and/or the image recording method. For example, in the case of chest image recording, the pattern of the histogram becomes as shown in FIG. 7, and it is possible to know that J in the histogram denotes the mediastinum, K denotes the heart, L denotes the lungs, M denotes the skin and the soft tissue, and N denotes the region outside of the object. Therefore, from the histogram, it is possible to calculate the maximum image signal level Pmax and the minimum image signal level Pmin defining the desired image signal range. For example, in the case where information on the skin and the soft tissue (M) and information on the region outside of the object (N) are unnecessary in FIG. 7, the desired image signal range becomes that from Pmax to Pmin including J, K and L as shown. The maximum image signal level Pmax and the minimum image signal level Pmin may be calculated by use of various methods from the histogram, for example, by determining threshold values T1 and T2 in accordance with the desired image signal range and calculating Pmax and Pmin on the basis of T1 and T2.

On the other hand, in the radiation image recording and reproducing system, the final read-out image signals are generally obtained from the light emitted by the stimulable phosphor sheet in proportion to the stored radiation energy by use of the photoelectric read-out means as mentioned above, and are subjected to gradation processing and other signal processing in an image processing means. The processed image signals are used to reproduce a visible image on a photographic film or the like by use of the image reproduction means. The reproduced visible image should have a correct density range suitable for viewing, particularly for diagnostic purposes. In general, the correct density range (Dmax to Dmin) is determined in advance. Also, image reproducing conditions in the image reproduction means (i.e. the conditions determining the relationship between the input to the image reproduction means and the output therefrom) are determined in advance. Therefore, the range of signal levels (Rmax to Rmin) which should be sent to the image reproduction means as suitable for obtaining the correct density range (Dmax to Dmin) is determined by the image reproducing conditions.

Accordingly, the gradation processing conditions in the gradation processing are adjusted so that the maximum image signal level Pmax and the minimum image signal level Pmin calculated in the manner as mentioned above correspond to the maximum signal level Rmax and the minimum signal level Rmin determined in the manner as mentioned above.

The gradation processing is carried out for converting the level of each image signal fed to an image processing means (a gradation processing means) by use of predetermined conditions. The predetermined conditions are referred to as the gradation processing conditions, and the gradation processing conditions are usually expressed by a non-linear gradation curve.

The purpose of the gradation processing is to obtain a visible reproduced image suitable for viewing, particularly for diagnostic purposes, in accordance with the image recording conditions, for example, the image recording portion of the object such as the head or the chest, and/or the image recording method such as plain image recording or contrasted image recording. Therefore, in general, basic patterns of non-linear gradation processing conditions most suitable for the respective image recording conditions should preferably be determined in advance, one of the basic patterns of the gradation processing conditions should be selected in accordance with the image recording conditions of an image in the course of gradation processing of the image, and the gradation processing should be carried out by use of the selected basic pattern.

Also in this embodiment, an appropriate basic pattern is selected from those of the gradation processing conditions predetermined in accordance with the image recording conditions of images. The gradation processing conditions which are to be used are adjusted by correcting the selected basic pattern on the basis of the image signals inside of the irradiation field, i.e. by, as shown in FIG. 7, vertically shifting the selected basic pattern or rotating it around a predetermined center point 0 so that Pmax corresponds to Rmax or Pmin corresponds to Rmin.

Besides the non-linear gradation processing conditions determined by the image recording conditions as mentioned above, linear gradation processing conditions may be used in some cases. In such a case, the gradation processing conditions which are to be used are adjusted by rotating or shifting a single predetermined straight line in the manner as mentioned above so that Pmax corresponds to Rmax or Pmin corresponds to Rmin. The adjustment of the gradation processing conditions by this method is carried out on the basis of only the image signals inside of the irradiation field, instead of on the basis of the image recording portion of the object and/or the image recording method.

With the method wherein Pmax and Pmin are calculated from the histogram of the final read-out image signals and the gradation processing conditions are adjusted so that Pmax and Pmin respectively correspond to Rmax and Rmin, the problems as described below arise in the case where the image signals caused by the scattered radiation outside of the irradiation field are included in the histogram of the final read-out image signals.

Specifically, the image signal level caused by the scattered radiation outside of the irradiation field on the stimulable phosphor sheet is often higher than the image signal level inside of the irradiation field, it is not always possible to discriminate between the image signal levels inside and outside of the irradiation field in the histogram including both of them. Therefore, in the case where Pmax and Pmin are calculated from the histogram as mentioned above and the image processing conditions are adjusted on the basis of Pmax and Pmin, the minimum image signal level inside of the irradiation field is not detected as Pmin, and that caused by the scattered radiation outside of the irradiation field is detected as Pmin. In general, the minimum image signal level outside of the irradiation field is lower than that inside of the irradiation field. Accordingly, when the minimum image signal level outside of the irradiation field is detected as Pmin, signals caused by the scattered radiation not related to diagnosis are taken within a low density range in the course of reproduction of a visible image, and the density of the image of the portion related to diagnosis becomes too high. As a result, the image contrast decreases and it becomes difficult to make an accurate diagnosis.

However, with the aforesaid embodiment wherein Pmax and Pmin are calculated based on the the histogram of the final read-out image signals obtained by removing the image signals caused by the scattered radiation outside of the irradiation field, the aforesaid problems can be eliminated.

Specifically, in the case where gradation processing of the image signals is carried out by use of the gradation processing conditions adjusted to appropriate values in accordance with the image signal histogram of each radiation image stored on the stimulable phosphor sheet, it becomes possible to process so that the necessary object image information is always expressed within the correct density range for viewing, particularly for diagnostic purposes, in every reproduced visible image regardless of any fluctuation in the level of the radiation energy stored on the stimulable phosphor sheet, which is caused by changes in the object, the image recording portion thereof, radiation dose, or the like. Particularly, in accordance with the present invention wherein the gradation processing conditions are adjusted based on the histogram of the final read-out image signals free from noise caused by the scattered radiation, the effects of expressing the necessary object image information within the correct density range are enhanced markedly.

The method of adjusting the gradation processing conditions in the manner as mentioned above is advantageous particularly in the case where the image signals detected by use of the read-out conditions adjusted without considering a fluctuation in the radiation energy level range recorded in each image recording as mentioned above are to be processed.

I claim:

1. A method of adjusting image processing conditions in the case where final read-out image signals obtained by final read-out carried out for detecting the image signals for use in reproduction of a visible image from a recording medium, carrying a radiation image recorded thereon by limitation of an irradiation field, are processed, the method of adjusting image processing conditions comprising the steps of:
   (i) creating a histogram of said final read-out image signals obtained by said final read-out,
   (ii) detecting prospective edge point signals, which are considered to be signals representing edge portions of said irradiation field, from said final read-out image signals and creating a histogram of said prospective edge point signals,
   (iii) from said histogram of prospective edge point signals determining as a characteristic value a signal level representing said edge portions of said irradiation field,
   (iv) removing a region of a level lower than the level of said characteristic value from said histogram of final read-out image signals, and
   (v) adjusting said image processing conditions on the basis of said histogram of final read-out image signals outside of said lower level region.

2. A method as defined in claim 1 wherein said characteristic value is a signal value at which the frequency is the maximum in a histogram of said prospective edge point signals.

3. A method as defined in claim 1 wherein said characteristic value is the minimum value of said prospective edge point signals.

4. A method as defined in claim 1 wherein said characteristic value is the median value of said prospective edge point signals.

5. A method as defined in claim 1 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

6. A method as defined in claim 1 wherein said stimulating rays are a laser beam.

7. A method as defined in claim 1 wherein said image processing conditions are gradation processing conditions, and said gradation processing conditions are adjusted by:
   (a) calculating the maximum image signal level Pmax and the minimum image signal level Pmin of a desired image signal range in said histogram outside of said lower level region, and
   (b) adjusting said gradation processing conditions so that the maximum image signal level Pmax and the minimum image signal level Pmin correspond respectively to the maximum signal level Rmax and the minimum signal level Rmin of a desired input signal range in an image reproduction means which are determined by the maximum density Dmax and the minimum density Dmin of a correct density range in a reproduced visible image.

* * * * *